United States Patent [19]

Brumby

[11] Patent Number: 5,074,407
[45] Date of Patent: Dec. 24, 1991

[54] IMPACT ABSORBING SUPPORT MEMBER

[76] Inventor: John A. Brumby, Rustwood House, Hewaswater, St Austell, Cornwall, PL26 7JF, England

[21] Appl. No.: 499,962

[22] Filed: Mar. 27, 1990

[51] Int. Cl.⁵ .............................................. B65G 15/60
[52] U.S. Cl. ................................. 198/841; 198/860.3; 267/140
[58] Field of Search ...................... 198/841, 843, 836.1, 198/836.3, 836.4, 956, 860.3; 267/140; 293/120, 122, 155

[56] References Cited

U.S. PATENT DOCUMENTS

| | | | |
|---|---|---|---|
| 2,798,756 | 7/1957 | Corydon | 293/155 |
| 3,110,066 | 11/1963 | Ward et al. | 293/120 |
| 3,843,182 | 10/1974 | Walls et al. | 267/140 |
| 4,932,516 | 6/1990 | Andersson | 198/841 |

FOREIGN PATENT DOCUMENTS

| | | | |
|---|---|---|---|
| 633707 | 1/1962 | Canada | 293/120 |
| 2174231 | 10/1973 | France . | |
| 1460104 | 12/1976 | United Kingdom . | |
| 2088254 | 6/1982 | United Kingdom . | |

Primary Examiner—Joseph E. Valenza
Attorney, Agent, or Firm—Banner, Birch, McKie & Beckett

[57] ABSTRACT

An elongate impact absorbing support member for a roller conveyor, conveyor belt or other structure comprising a unitary body having two generally parallel side wall portions joined along two parallel elongate edges by a crown portion, to form respective shoulders and having respective elongate attachment foot portions along parallel edges opposite the said parallel elongate edges whereby to receive and engage a clamp member for securing the impact absorber member to an underlying support structure, the wall portions being curved from the shoulder portions to the foot portions thereof.

12 Claims, 2 Drawing Sheets

IMPACT ABSORBING SUPPORT MEMBER

BACKGROUND OF THE INVENTION

Conveyor belts, are usually supported on a plurality of rollers and although a conveyor belt may comprise a continuous web or a layer formed by linked elements, the forces exerted by an article supported on a conveyor belt are transferred to individual support rollers which, provide a plurality of support points constituted by the crests of successive rollers so that an article carried by a conveyor belt is effectively supported by a number of line contacts across the length of the conveyor. In the case of the conveyor belt the web is unsupported between adjacent roller crests. This situation is usually satisfactory because the article carried by the belt conveyor spans a plurality of rollers and the overall load applied to any one roller by an article is limited to a fraction of the article weight. At a loading point, however, especially if the conveyor is loaded from above rather than from an end or one side, shock loading can occur which may cause fracture of the rollers if it exceeds a critical threshold value. When belt conveyors are used to carry irregular articles such as rocks loaded from above, which may be of different size and weight as they arrive at the conveyor, there is a serious risk of damage to the rollers if these are allowed to fall onto the conveyor due to the high shock loading level of individual rollers at the contact point.

The conveyor belt may also suffer damage where items such as rocks impact onto the surface of the belt at the point of support by the rollers or may be pierced by impact between the contact points. In order to overcome this problem it is known to provide elongate supports to carry the shock loading of articles arriving from above onto a belt conveyor. Known such supports are constituted by elongate rubber blocks provided with a suitable facing, but such blocks are expensive and difficult to fit, have a short life and are generally unsatisfactory.

OBJECTS OF THE INVENTION

A primary object of the present invention is to provide an impact absorbing support member suitable for use on a conveyor belt or other like structure, which will provide an economical alternative to known such supports.

A further object of the invention is to provide an impact absorbing member which will also have a considerably longer service life.

Another object of the invention is to provide an impact absorbing member which will be much easier to fit and adjust than known such supports.

SUMMARY OF THE INVENTION

According to one aspect of the present invention, therefore, an elongate impact absorbing support member for a conveyor belt or other like structure, comprises a unitary body having two generally parallel side wall portions joined along two parallel elongate edges by a crown portion to form respective shoulders, and having respective elongate attachment foot portions along parallel edges opposite the said parallel elongate edges whereby to receive and engage a clamp member for securing the impact absorber member to an underlying support structure, the wall portions being curved from the shoulder portions to the foot portions thereof.

In a preferred embodiment of the invention the said elongate attachment foot portions of each wall portion project towards the opposite wall portion of the member. Alternatively, of course the foot portions may project outwardly away from the opposite wall portions, but it is found that the preferred structure referred to above results in a compact support member which can be placed closely adjacent similar such support members to provide a support area. In either case it is preferred that the curvature of the side walls is convex outwardly. Outwardly convex side walls have the advantage, as will be described in more detail below, that the resistance of the unitary body to cracking under severe load is minimised and the strength of the support member can be maximised for a minimum use of material.

It is preferred that the side walls have a substantially constant thickness from the said shoulder portions of the said foot portion thereof although the thickness at the shoulder portion and at the junction with the foot portion may be enlarged to accommodate the stress concentrations which occur in use at these points.

Each attachment foot portion preferably has a clamp engagement surface inclined downwardly away from an upper end nearer the foot portion of the other side wall towards the junction of the foot portion with the associated side wall. The forces transmitted by the clamp member to the foot portion thus includes a component laterally of the side wall towards the opposite side wall to draw the two foot portions towards a longitudinal central plane passing through the clamp member and thereby reinforce the clamping action. Each said foot portion preferably has an end face lying in a plane substantially parallel to the corresponding end face of the foot portion of the opposite side wall. Again, this facilitates the introduction between the two opposite foot portions of the shank of a clamping member as will be described in more detail below.

The inner surfaces of the side walls, namely the surfaces facing each other, are preferably smoothly continuous from the foot portion of the wall to the crown portion of the support member without surface discontinuity at the shoulder portion. This latter is particularly important since the pending stresses exerted on the body by shock or other loads applied to the crown cause tearing stresses at the inner surfaces of the wall portions where they meet the crown, namely at the shoulder portions, and stress concentrations resulting from surface discontinuities would seriously weaken the body and result in the formation of cracks at these points after a short service life.

Preferably the said unitary body is integrally formed from cast or moulded polyurethane or other such resilient resin material. The crown portion of the unitary body is preferably bonded or otherwise attached to a wear resistant layer of material having a low coefficient of friction and in the preferred embodiment of the invention the said wear resistant layer is formed as a pad of polyurethane or like castable or mouldable resin material the resilience of which is less than that of the material of the said unitary body. It has been found that harder resin materials have a lower coefficient of friction and a higher resistance to wear. The present invention thus provides a monolithic body having portions of appropriate characteristics to the functions which they have to perform, namely a hard wear resistant surface which is likely to be contacted by moving bodies and resiliently flexible side walls which are required to absorb the shocks of loads applied to the crown portion via the wear resistant layer.

The present invention also comprehends a support assembly for a conveyor belt or like structure comprising an impact absorbing wear resistant support member as defined hereinabove in combination with at least one clamp member having a threaded shank and projecting arms shaped to engage the said clamp engaging surfaces of the foot portions of the side walls of the unitary body thereof.

Also encompassed within the scope of the present invention is a conveyor belt assembly comprising a web or linked conveyor belt elements supported on a plurality of rollers and having at least one elongate impact absorbing member as hereinabove defined fitted underneath the conveyor belt with the crown portion or wear resistant layer thereof in contact with the undersurface of the belt and mounted so as to support shock loading applied to the belt from above, such as at an article loading station.

The present invention also comprehends an elongate support member for a conveyor belt or like structure, adapted to absorb impacts arising by shock loading of the conveyor, comprising a monolithic body of resilient material having two side walls joined by a crown connected to the side walls at respective shoulder portions, the side walls each being curved from the respective shoulder portion to a respective foot portion and the inner surface of the member being a smoothly continuous curve from the inner surface of a side wall member to the undersurface of the crown portion. The invention, in this aspect, can thus be considered as a channel shape element of specific form the configuration of which is adapted to the specific purposes each part has to perform.

Further features and advantages of the present invention will become apparent from a study of the following detailed description, in which reference will be made to the accompanying drawings, which are provided purely h way of non-limitative example only.

DESCRIPTION OF THE PREFERRED EMBODIMENT

Figure 1:
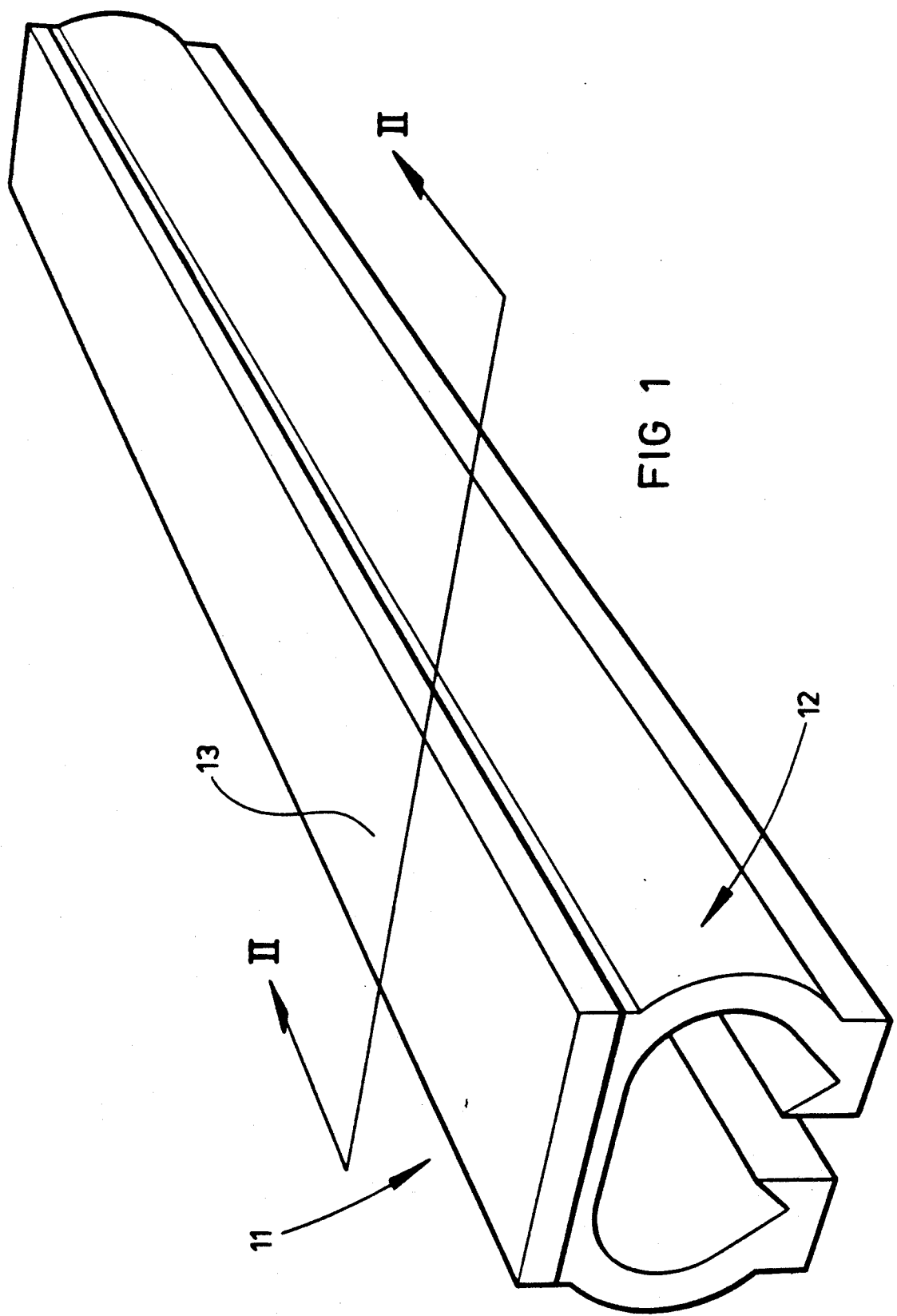
FIG. 1 is a perspective view of an element formed as an embodiment of the present invention.

Referring now to the drawings the impact absorber shown is generally identified with the reference numeral 11 and comprises a unitary body 12 of generally channel shape form which will be described in more detail in relation to FIG. 2 with a surface pad 13 of hard wear resistant low friction material bonded thereto along a bond line 14.

Figure 2:
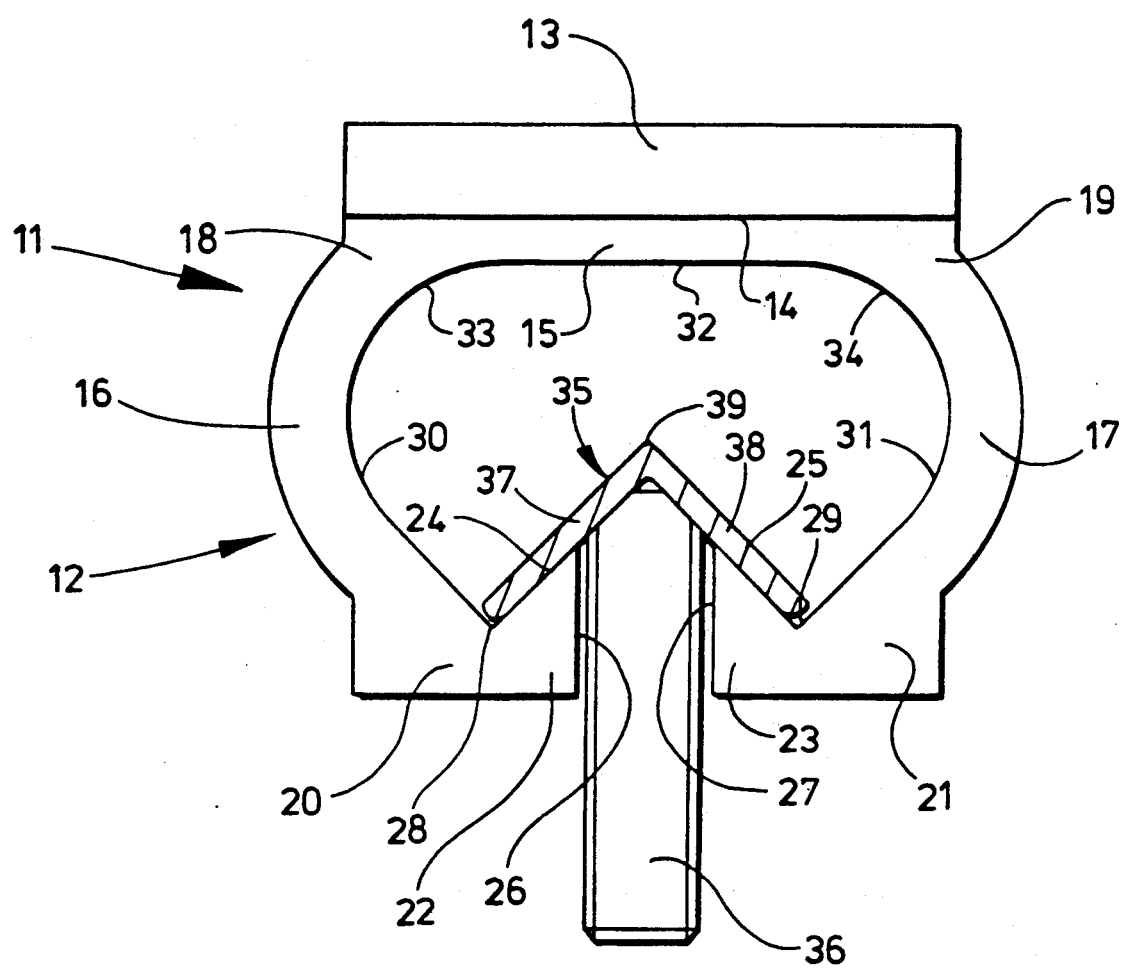
FIG. 2 is a sectional view taken on the line II—II of FIG. 1 and showing the element with a clamping member in position.

As can be seen from FIG. 2, the unitary body 12 comprises a crown portion 15 joined to left and right side wall portions 16, 17 respectively by shoulder portions 18, 19. Each of the side wall portions 16, 17 has a respective enlarged foot portion 20, 21 which are thicker than the side wall portions 16, 17 and each of which has an inner foot projection 22, 23 defined from the major part of each foot 20, 21 by an inclined surface 24, 25 which meets a bounding surface 26, 27 of the inner foot projections 22, 23 at an apex, the bounding surfaces 22, 23 being parallel to one another and defining the separation between the points of closest approach of the opposite foot portions 20, 21. Each inclined surface 24, 25 slopes upwardly from a junction line 28, 29 with a respective inner side wall surface 30, 31 of the respective side walls 16, 17.

These side wall surfaces 30, 31 merge in a continuous curve through the inner side wall surfaces 33, 34 at the shoulder portions 18, 19 with the inner side wall surface 32 of the crown portion 15 without surface discontinuities. The inner side wall surface of the unitary body 11 is thus smoothly continuous without sharp corners from the junction line 28 between the inclined upper surface 24 of the inner foot projection 22 of the left hand foot 20 through the side wall surface portion 30 the inner shoulder portion 33, the lower surface 32 of the crown portion 15, the inner surface 34 of the right hand shoulder portion 19, the inner surface 31 of the right hand wall portion 17 and the junction line 29 between this latter and the inclined upper surface 25 of the inner foot projection 23 of the right hand foot portion 21.

The unitary body 11 is secured to an underlying structure by a clamp member generally indicated 35 having a threaded shank 36 from which project two lateral arms 37, 38 inclined downwardly from an apex 39 at an angle matching that of the inclination of the upper inclined surfaces 24, 25 of the inner foot projections 22, 23 of the foot portions 20, 21 of the side walls 16, 17. The clamping member 35 is introduced into the unitary body 12 from one end and located by sliding along the body 12 to an appropriate position to receive a threaded clamping member such as a nut or wing nut at its lower end. In this position the foot portions 20, 21 are secured fixedly to an underlying surface and prevented from moving either inwardly or outwardly with respect to a central longitudinal plane A—A identified in FIG. 2. Any downwardly applied loading on the wear pad 13 bonded to the crown 15 causes bending or flexing stresses to be applied to the side walls 16, 17 which, because of the configuration described hereinabove, can resiliently absorb such stresses without the generation of surface cracks which would lead to structural failure.

Conveniently, the material of the wear resistant pad 13 is a hard polyurethane having a low coefficient of friction which can be bonded directly to the more resilient material of the unitary body 12 to provide secure attachment.

What is claimed is:

1. An elongate impact absorbing support member for use in a roller conveyor or a conveyor belt, said support member comprising:
    a unitary body, said unitary body having first and second resilient supporting side wall portions extending along the length of said body;
    crown portion means joining said side wall portions along two parallel elongate edges thereof, said crown portion means forming a crown platform upstanding from said body and joining said side wall portions at respective shoulders; and
    respective elongate attachment foot portions of said side wall portions extending along parallel edges of said side wall portions opposite said parallel elongate edges, said foot portions each extending from one said side wall portion toward the other said side wall portion and the interior surface of said wall portions being curved continuously from said crown portion to said foot portions thereof.

2. The elongate impact absorbing support member of claim 1 wherein said curvature of the side walls is outwardly convex.

3. The elongate impact absorbing support member of claim 1, wherein said side walls have a substantially constant thickness from said shoulder portion to said foot portion thereof.

4. The elongate impact absorbing support member of claim 1, wherein each said attachment foot portion has a clamp engagement surface inclined downwardly away from an upper end nearer the foot portion of said other side wall towards the junction of said foot portion with the associated side wall.

5. The elongate impact absorbing support member of claim 1, in which each said foot portion has an end face lying in a plane substantially parallel to the corresponding end face of the foot portion of said opposite side wall 6. The elongate impact absorbing support member of claim 1, wherein the inner surfaces of the side walls, namely the surfaces facing each other, are smoothly continuous from said foot portion of said wall to said crown portion of said support member without surface discontinuity at said shoulder portion.

7. The elongate impact absorbing support member of claim 1, wherein said unitary body is integrally formed from one of cast and moulded polyurethane and other resilient resin material.

8. The elongate impact absorbing support member of claim 1, wherein said crown portion of said unitary body is bonded to a wear resistant layer of material having a low coefficient of friction.

9. The elongate impact absorbing support member of claim 1, wherein said crown portion of said unitary body is secured by adhesive to a wear resistant layer having a low coefficient of friction.

10. The elongate impact absorbing support member of claim 9, wherein said wear resistant layer is formed as a pad of polyurethane the resilience of which is less than that of the material of the said unitary body.

11. A support assembly for a roller conveyor, conveyor belt or like structure comprising, in combination:
an elongate impact absorbing support member comprising a unitary body, said unitary body having first and second resilient supporting side wall portions extending along the length of said body;
crown portion means joining said side wall portions along two parallel elongate edges thereof, said crown portion means forming a crown platform upstanding from said body and joining said side wall portions at respective shoulders;
respective elongate attachment foot portions of said side wall portions extending along parallel edges of said side wall portions opposite said parallel elongate edges, said foot portions each extending from one said side wall portion toward the other said side wall portion and the interior surface of said wall portions being curved continuously from said crown portion to said foot portions thereof;
each said attachment foot portion having a clamp engagement surface inclined downwardly away from an upper end nearer the foot portion of said other side wall toward the junction of said foot portion with the associated side wall; and
at least one clamp member having a threaded shank and projecting arms shaped to engage said clamp engaging surfaces of said foot portion of said side walls of said unitary body of said elongate impact absorbing support member.

12. In combination:
a conveyor belt assembly comprising a loop of web or linked conveyor belt elements supported on a plurality of rollers;
at least one elongate impact absorbing support member, said support member comprising:
a unitary body, said unitary body having first and second side wall portions extending along the length of said body;
crown portion means joining said side wall portions along two parallel elongate edges thereof, said crown portion means forming a crown platform upstanding from said body and joining said side wall portions at respective shoulders; and
respective elongate attachment foot portions of said side wall portions extending along parallel edges of said side wall portions opposite said parallel elongate edges, said foot portions each extending from one said side wall portion toward the other said side wall portion and the interior surface of said wall portions being curved continuously from said crown portion to said foot portions thereof, said elongate impact absorbing support member being fitted underneath said conveyor belt with said crown portion thereof in contact with the under surface of said conveyor belt and mounted so as to support shock loading applied to said belt from above, such as at an article loading station.

* * * * *